(12) United States Patent
Patil et al.

(10) Patent No.: US 11,076,413 B2
(45) Date of Patent: Jul. 27, 2021

(54) MULTIPLE WIRELESS COMMUNICATION TECHNOLOGY CO-CHANNEL COEXISTENCE

(71) Applicant: QUALCOMM incorporated, San Diego, CA (US)

(72) Inventors: Shailesh Patil, San Diego, CA (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 16/716,296

(22) Filed: Dec. 16, 2019

(65) Prior Publication Data

US 2020/0196325 A1    Jun. 18, 2020

Related U.S. Application Data

(60) Provisional application No. 62/781,470, filed on Dec. 18, 2018.

(51) Int. Cl.
*H04M 1/00* (2006.01)
*H04W 72/12* (2009.01)
(Continued)

(52) U.S. Cl.
CPC ......... *H04W 72/1215* (2013.01); *H04W 4/40* (2018.02); *H04W 74/0808* (2013.01); *H04W 88/06* (2013.01)

(58) Field of Classification Search
CPC ............... H04W 72/1215; H04W 4/40; H04W 74/0808; H04W 88/06
(Continued)

(56) References Cited

U.S. PATENT DOCUMENTS

2018/0263052 A1* 9/2018 Xu .......................... H04Q 11/02
2018/0324827 A1* 11/2018 Abraham .............. H04L 47/215
(Continued)

FOREIGN PATENT DOCUMENTS

WO    WO-2018209122 A1    11/2018

OTHER PUBLICATIONS

Intel Corporation: "LTE-V2V Coexistence with DSRC Technology", 3GPP Draft, 3GPP TSG RAN WG1 Meeting #87, R1-1611924 Intel—V2V DSRC, 3rd Generation Partnership Project (3GPP), Mobile Competence Centre, 650, Route Des Lucioles, F-06921 Sophia-Antipolls Cedex, France, vol. RAN WG1, No. Reno. USA, Nov. 14, 2016-Nov. 18, 2016, Nov. 13, 2016 (Nov. 13, 2016), XP051175890, pp. 1-8 Retrieved from the Internet: URL: http://www.3gpp.org/ftp/Meetings_3GPP_SYNC/RAN1/Docs/, [retrieved on Nov. 13, 2016], p. 1, line 31-line 32 p. 1, line 34-line 35 p. 2, line 1-line 6 p. 2, line 18-line 19 p. 2, line 40-line 42 p. 3, line 24-line 29 p. 4, line 3-line 6 p. 4, line 30-line 35.
(Continued)

*Primary Examiner* — Danh C Le
(74) *Attorney, Agent, or Firm* — Holland & Hart LLP

(57) ABSTRACT

Methods, systems, and devices for wireless communications are described. The described techniques provide identifying a first set of time intervals for transmissions in a channel using a first wireless communications technology (e.g., a set of LTE-V2X intervals reserved for LTE-V2X transmissions) and a second set of time interval designated for transmissions in the channel using a second wireless communications technology (e.g., a set of DSRC intervals reserved for DSRC transmissions). A UE may determine whether one of the sets of time intervals is available for transmitting V2X messages using one wireless communications technology by performing energy detection for a threshold amount of time. The UE may then, based on the results of the energy
(Continued)

detection, transmit the V2X message using the first wireless communication technology during a second set of time intervals or during a subsequent first set of time intervals.

30 Claims, 11 Drawing Sheets

(51) Int. Cl.
  *H04W 74/08* (2009.01)
  *H04W 4/40* (2018.01)
  *H04W 88/06* (2009.01)
(58) Field of Classification Search
  USPC ............ 370/330, 329; 455/418, 552.1, 550.1
  See application file for complete search history.

(56) References Cited

U.S. PATENT DOCUMENTS

| 2019/0044779 | A1* | 2/2019 | Wu | H04W 4/40 |
| 2019/0069272 | A1* | 2/2019 | Tang | H04W 72/0453 |
| 2020/0033147 | A1* | 1/2020 | Ahn | G05D 1/0088 |
| 2020/0059273 | A1* | 2/2020 | Guo | H04L 1/18 |
| 2020/0120458 | A1* | 4/2020 | Aldana | H04W 36/08 |
| 2020/0143022 | A1* | 5/2020 | Frost | H04L 63/0884 |
| 2020/0146066 | A1* | 5/2020 | Nguyen | H04W 74/0816 |
| 2020/0163095 | A1* | 5/2020 | Kim | H04W 76/15 |
| 2021/0014656 | A1* | 1/2021 | Mueck | H04W 74/0816 |

OTHER PUBLICATIONS

International Search Report and Written Opinion—PCT/US2019/066890—ISAEPO—dated Mar. 19, 2020.
Qualcomm Incorporated: "Co-channel Coexistence for DSRC and LTE-V2V", 3GPP Draft, 3GPP TSG-RAN WG2 Meeting #96, R2-167891 Co-channel Coexistence for DSRC and LTE-V2V, 3rd Generation Partnership Project (3GPP), Mobile Competence Centre, 650, Route Des Lucioles, F-06921 Sophia-Antipolis Cedex, Fran, vol. RAN WG2, No. Reno, USA, Nov. 14, 2016-Nov. 18, 2016, Nov. 13, 2016 (Nov. 13, 2016), XP051177636, Retrieved from the Internet: URL: http://www.3gpp.org/ftp/Meetings_3GPP_SYNC/RAN2/Docs/, [retrieved on Nov. 13, 2016], p. 2, line 8-line 10, p. 5, line 32-line 41.

* cited by examiner

MULTIPLE WIRELESS COMMUNICATION TECHNOLOGY CO-CHANNEL COEXISTENCE

CROSS REFERENCE

The present Application for Patent claims the benefit of U.S. Provisional Patent Application No. 62/781,470 by PATIL, et al., entitled "MULTIPLE WIRELESS COMMUNICATION TECHNOLOGY CO-CHANNEL COEXISTENCE," filed Dec. 18, 2018, assigned to the assignee hereof, and expressly incorporated herein.

BACKGROUND

The following relates generally to wireless communications, and more specifically to multiple wireless communication technology co-channel coexistence.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some examples, such as distributed wireless networks, wireless devices (e.g., UEs) may directly communicate with each other (e.g., via sidelink communications) and may support various radio frequency and/or baseband capabilities. In some cases, direct communications between wireless devices may include direct communications between vehicles. Systems that use such communications may sometimes be referred to as vehicle-to-everything (V2X) communication systems. V2X communication links may convey important information between vehicles regarding inclement weather, nearby accidents, road conditions, and/or the activities of nearby vehicles, for example. V2X communication systems may also be used by autonomous or semi-autonomous vehicles (e.g., self-driving vehicles or vehicles that provide driver assistance) and may provide extra information beyond the reach of the vehicle's existing system. Such V2X communications links may provide certain safety-related information (e.g., location, direction of travel, velocity, etc.) in unencrypted messages so that other vehicles may receive such information.

In some examples of a wireless communications system, a UE may be capable of operating under one or more wireless communication technologies (e.g., LTE-V2X and dedicated short-range communications (DSRC)) for sending, for example, safety messages for vehicles in an intelligent transport systems (ITS) spectrum. For example, a UE may be an LTE-V2X device capable of sending LTE-V2X safety messages, and another UE may be a DSRC device capable of sending DSRC safety messages. As both types of devices may co-exist, efficient ways for two different devices (using different technologies) to co-exist are desired.

SUMMARY

The described techniques relate to improved methods, systems, devices, and apparatuses that support multiple wireless communication technology co-channel coexistence. Generally, the described techniques provide identifying a first set of time intervals for transmissions in a channel using a first wireless communications technology (e.g., a set of Long Term Evolution (LTE) vehicle-to-everything (V2X) intervals reserved for LTE-V2X transmissions) and a second set of time interval designated for transmissions in the channel using a second wireless communications technology (e.g., a set of dedicated short-range communications (DSRC) intervals reserved for DSRC transmissions). A user equipment (UE) may determine whether one of the sets of time intervals is available for transmitting V2X messages using one wireless communications technology by performing energy detection for a threshold amount of time. The UE may then, based on the results of the energy detection, transmit the V2X message using the first wireless communication technology during a second set of time intervals or during a subsequent first set of time intervals.

A method of wireless communications is described. The method may include identifying a first set of time intervals designated for transmission of V2X messages in a channel using a first wireless communication technology, identifying a second set of time intervals designated for transmission of V2X messages in the channel using a second wireless communication technology, the first set of time intervals being separate from the second set of time intervals, determining whether one of the second set of time intervals is available for transmission of one or more V2X messages of the first wireless communication technology, and transmitting the one or more V2X messages of the first wireless communication technology during at least one of the first set of time intervals or during the one of the second set of time intervals based on the availability of the one of the second set of time intervals.

An apparatus for wireless communications is described. The apparatus may include a processor, memory in electronic communication with the processor, and instructions stored in the memory. The instructions may be executable by the processor to cause the apparatus to identify a first set of time intervals designated for transmission of V2X messages in a channel using a first wireless communication technology, identify a second set of time intervals designated for transmission of V2X messages in the channel using a second wireless communication technology, the first set of time intervals being separate from the second set of time intervals, determine whether one of the second set of time intervals is available for transmission of one or more V2X messages of the first wireless communication technology, and transmit the one or more V2X messages of the first wireless communication technology during at least one of the first set of time intervals or during the one of the second set of time intervals based on the availability of the one of the second set of time intervals.

Another apparatus for wireless communications is described. The apparatus may include means for identifying a first set of time intervals designated for transmission of V2X messages in a channel using a first wireless communication technology, identifying a second set of time intervals designated for transmission of V2X messages in the channel using a second wireless communication technology, the first set of time intervals being separate from the second set of time intervals, determining whether one of the second set of time intervals is available for transmission of one or more V2X messages of the first wireless communication technology, and transmitting the one or more V2X messages of the first wireless communication technology during at least one of the first set of time intervals or during the one of the second set of time intervals based on the availability of the one of the second set of time intervals.

A non-transitory computer-readable medium storing code for wireless communications is described. The code may include instructions executable by a processor to identify a first set of time intervals designated for transmission of V2X messages in a channel using a first wireless communication technology, identify a second set of time intervals designated for transmission of V2X messages in the channel using a second wireless communication technology, the first set of time intervals being separate from the second set of time intervals, determine whether one of the second set of time intervals is available for transmission of one or more V2X messages of the first wireless communication technology, and transmit the one or more V2X messages of the first wireless communication technology during at least one of the first set of time intervals or during the one of the second set of time intervals based on the availability of the one of the second set of time intervals.

DETAILED DESCRIPTION

Figure 1:
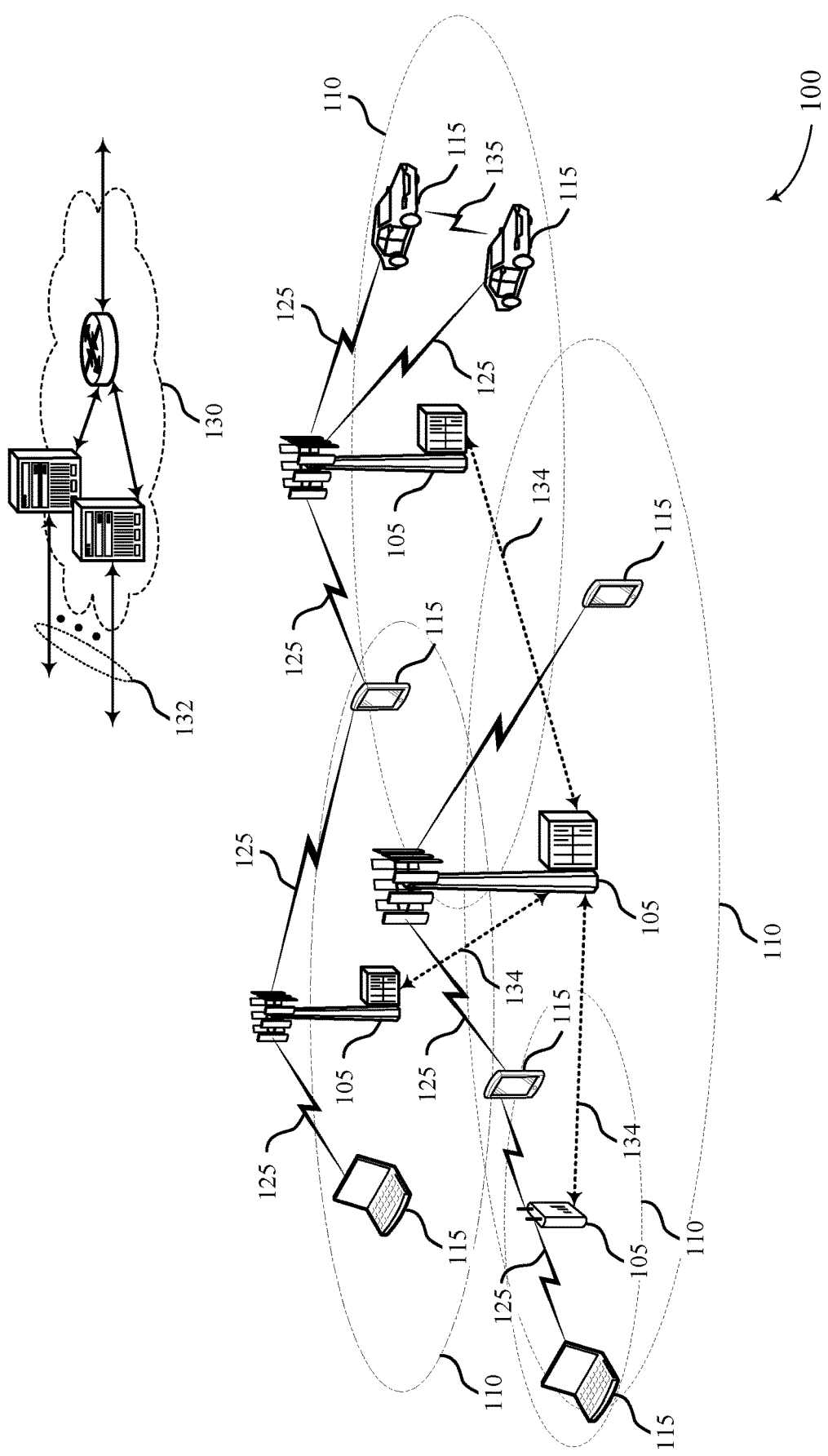
FIG. 1 illustrates an example of a system for wireless communications that supports multiple wireless communication technology co-channel coexistence in accordance with aspects of the present disclosure.

Some wireless communication systems may be used to facilitate communications with various devices, which may include vehicles. In some examples, communication between vehicles or between vehicles and other devices or user equipments (UEs) carried on or in connection with vehicles may be referred to as vehicle-to-everything (V2X) communications. V2X transmissions may include safety messages. In some examples, multiple wireless communications technologies and protocols may be available for transmitting V2X safety messages. For example, a UE may be capable of sending safety messages using one of a Long-Term Evolution (LTE)-V2X wireless communication technology or a dedicated short-range communications (DSRC) wireless communication technology. In some examples, UEs that are capable of using one technology (e.g., LTE-V2X or DSRC) may be able to use time resources dedicated to a different technology by using co-channel coexistence techniques between DSRC and LTE-VTX. Co-channel coexistence between two wireless communication technologies may increase efficient use of available spectrum, and may increase the number of devices that are able to detect or communicate with one another without changing existing protocols for either wireless communication technology. Additionally, a long-term coexistence scheme, as opposed to a transmission time interval (TTI) level coexistence scheme, may further increase efficiency and improve user experience.

In some examples, a channel for transmitting V2X safety messages may be divided into recurring sets of intervals reserved for specific wireless communication technologies. For instance, a first time interval may be reserved for transmitting LTE V2X messages, and a second interval may be reserved for transmitting DSRC messages (or vice versa). The intervals may be non-overlapping, and may alternate repeatedly. During the LTE-V2X interval, LTE-V2X devices may send LTE-V2X signals. Similarly, during the DSRC interval, DSRC devices may send DSRC signals. An interval during which a device can send its own wireless communication technology signals without checking for interference from another wireless communication technology may be referred to as a preferred interval. An interval during which a device must check for interference from another wireless communication technology may be referred to as a conflicting interval or a non-preferred interval.

During a conflicting interval, a UE may perform an energy detection procedure during a threshold amount of time to determine whether the UE is permitted to send a safety message using a conflicting wireless communication technology. To be clear, an LTE-V2X UE is capable of sending LTE-V2X messages. The LTE-V2X UE may send LTE-V2X messages during a preferred interval (a time duration reserved for the LTE-V2X messaging) or during a non-preferred or conflicting interval (a time duration reserved for messages based on a conflicting technology, such as DSRC). Similarly, a DSRC UE is capable of sending DSRC messages. The DSRC UE may send DSRC messages during a preferred interval (a time duration reserved for the DSRC messaging) or during a non-preferred or conflicting interval (a time duration reserved for messages based on a conflicting technology, such as LTE-V2X).

A UE may be capable of identifying energy that results from its preferred wireless communication technology used by other devices on the channel, but may be unable to identify a specific wireless communication technology that is generating energy on the channel using a different wireless communication technology. For instance, an LTE-V2X UE may be capable of detecting a total amount of energy on a channel, and may be able to determine how much of the total amount of energy is due to devices using the same type of technology (e.g., LTE-V2X). Upon measuring the channel and detecting energy during a threshold amount of time, the UE may identify a total energy on the channel and a preferred wireless communication technology energy on the channel. The UE may calculate a ratio of preferred energy to total energy on the channel during the threshold amount of time, and determine, based on the ratio being sufficiently high, whether the UE may reasonably send a safety message on the channel during the conflicting interval. For example, an LTE-V2X UE may detect a total energy on the channel and an LTE-V2X energy on the channel during a DSRC time interval. If the ratio satisfies a configured threshold (more LTE-V2X UEs are transmitting on the channel and less DSRC UEs are transmitting on the channel, indicating that the conflicting interval is not being fully utilized by DSRC UEs) then the LTE-V2X UE may send an LTE-V2X safety message during the DSRC interval. Alternatively, if the ratio is below a configured threshold (less LTE-V2X UEs are transmitting on the channel and more DSRC UEs are transmitting on the channel, indicating that the conflicting interval is being more fully utilized by DSRC UEs), then the LTE-V2X UE may not send an LTE-V2X safety message during the DSRC interval, and may instead send the LTE-V2X safety message during a subsequent (e.g., next) LTE-V2X interval.

In some examples, the threshold amount of time for detecting energy may be located before or after a transmission time interval (TTI) (e.g., subframe) boundary, based on the timing requirements of the wireless communication technology of an interval. For example, LTE-V2X transmissions may be sent on a subframe basis (e.g., each transmission may initiate and terminate at a subframe boundary). Alternatively, DSRC transmissions may be less than 1 ms (e.g., a number of symbols). For an LTE-V2X UE attempting to transmit during a DSRC interval, the LTE-V2X UE may detect energy for a threshold amount of time equal to a number of symbols prior to an initial subframe boundary of a subframe that could potentially be used to carry an LTE-V2X transmission. Such energy detection prior to a subframe boundary may identify DSRC energy from DSRC UEs at a time that is near to when the LTE-V2X transmission may occur. Thus, if an LTE-V2X device detects a high ratio of LTE-V2X energy to total energy, then the LTE-V2X UE may confidently initiate a transmission at the subframe boundary subsequent to the energy detection. For a DSRC UE attempting to transmit during an LTE-V2X interval, the DSRC UE may detect energy for a threshold amount of time equal to a number of symbols after a TTI boundary (e.g., a subframe boundary). If LTE-V2X devices are transmitting on the channel during the LTE-V2X interval, then such transmissions will initiate at a subframe boundary. If the DSRC device detects a low ratio of DSRC energy to total energy during the threshold amount of time after a subframe boundary, then the DSRC device may determine that the channel is being used by too many LTE-V2X devices, and may refrain from transmitting. However, if the DSRC device detects a high ratio of DSRC energy to total energy during the threshold amount of time after a subframe boundary, the DSRC device may determine that the channel is not being used by many LTE-V2X devices, and may send a transmission (e.g., having a duration of less than one ms) during the LTE-V2X interval.

Particular aspects of the subject matter described herein may be implemented to realize one or more advantages. The described techniques may support co-channel coexistence between two wireless communication technologies may increase efficient use of available spectrum, and may increase the number of devices that are able to detect or communicate with one another without changing existing protocols for either wireless communication technology. Additionally, a long-term coexistence scheme, as opposed to a TTI level coexistence scheme, may further increase efficiency and improve user experience. As such, supported techniques may include improved network operations and, in some examples, may promote device and network efficiencies, among other benefits.

Aspects of the disclosure are initially described in the context of a wireless communications system. Aspects of the disclosure are further illustrated by and described with reference to timelines, and process flows. Aspects of the disclosure are further illustrated by and described with reference to apparatus diagrams, system diagrams, and flowcharts that relate to multiple wireless communication technology co-channel coexistence.

FIG. 1 illustrates an example of a wireless communications system 100 that supports multiple wireless communication technology co-channel coexistence in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

Wireless communications system 100 may support direct communication between UEs 115 over a sidelink 135 (e.g., using a peer-to-peer (P2P), device-to-device (D2D) protocol, or ProSe direct communications). Sidelink communication may be used for D2D media-sharing, vehicle-to-vehicle (V2V) communication, V2X communication (or cellular V2X (cV2X) communication), emergency rescue applications, etc. One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may support the transmission of competing V2X technology messages. For example, wireless communications system 100 may support transmission of LTE-V2X messages as well as DSRC messages. For example, a UE 115 may identify a first set of time intervals for transmissions in a channel using a first wireless communications technology (e.g., a set of LTE-V2X intervals reserved for LTE-V2X transmissions) and a second set of time interval designated for transmissions in the channel using a second wireless communications technology (e.g., a set of DSRC intervals reserved for DSRC transmissions). A UE 115 may determine whether one of the sets of time intervals is available for transmitting V2X messages using one wireless communications technology by performing energy detection for a threshold amount of time. The UE 115 may then, based on the results of the energy detection, transmit the V2X message using the first wireless communication technology during a second set of time intervals or during a subsequent first set of time intervals.

Figure 2:
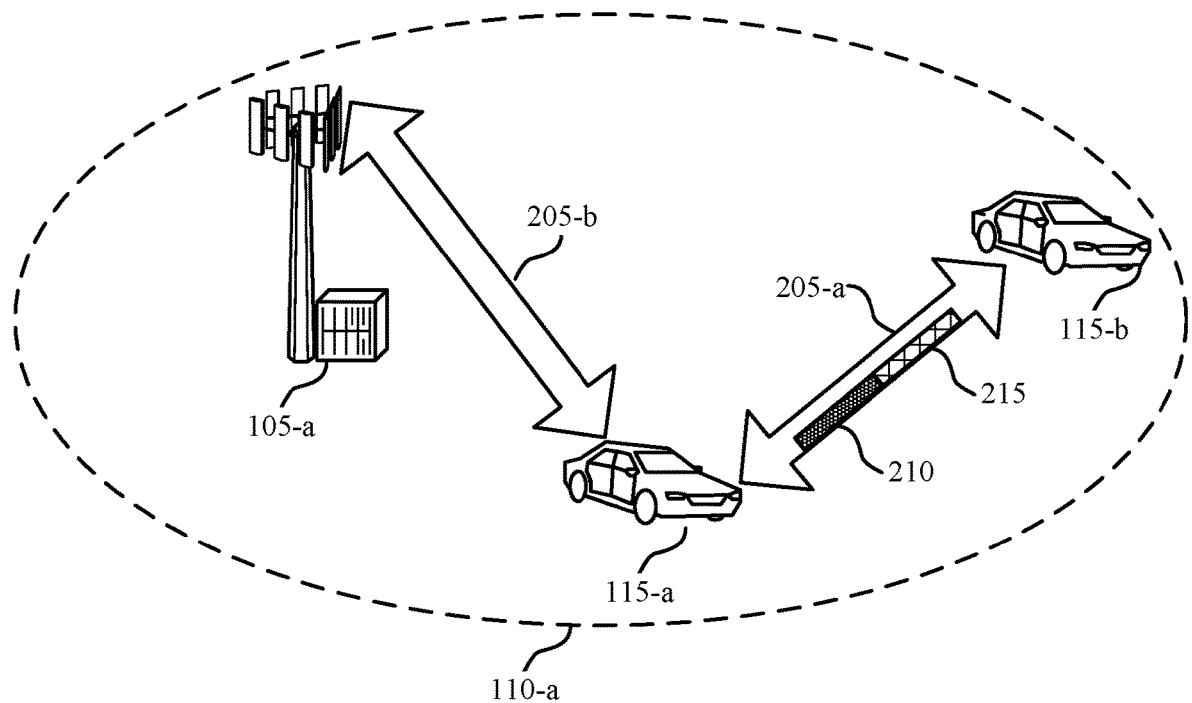
FIG. 2 illustrates an example of a wireless communications system that supports multiple wireless communication technology co-channel coexistence in accordance with aspects of the present disclosure.

FIG. 2 illustrates an example of a wireless communications system 200 that supports multiple wireless communication technology co-channel coexistence in accordance with aspects of the present disclosure. In some examples, wireless communications system 200 may implement aspects of wireless communication system 100. Wireless communications system 200 may include a UE 115-a and a UE 115-b, which may be examples of corresponding devices described with respect to wireless communication system 100.

In some cases, UEs 115 may be vehicles, and in some cases, UEs 115 may be integrated with a vehicle. UEs 115-a and/or 115-b may be examples of a UE 115 described with reference to FIG. 1 (e.g. a phone, laptop, vehicle, etc.), and may be configured for V2X communication over one or more carriers (e.g., using ProSe direct communications). In some examples, UEs 115 may execute one or more sets of codes or sequences, to control the functional elements of the device, and perform some or all of the functions described below. In some cases, a communications manager at each UE 115 may manage V2X communications. While various examples described herein illustrate V2X communications using LTE or DSRC between UEs 115, it will be understood that techniques provided herein may be used in other communications systems that may use different radio access technologies (RATs) and communications protocols.

In some examples, UEs 115 may communicate with other UEs 115, or with other devices, such as base station 105-a, stoplights, displays, etc. For instance, UE 115-a may communicate with UE 115-b via bidirectional communication link 205-a, and base station 105-a via bidirectional communication link 205-b. In some examples, a UE 115 may send V2X safety messages, which may be utilized by other devices to avoid hazards, make informed travel decisions, improve travel experience, etc. A UE 115 may be capable of communicating via one or more wireless communications technologies. For example, UE 115-a may be an LTE-V2X device, capable of communicating with UE 115-b (and other devices) via a channel on bidirectional communication link 205-a. In some examples, UE 115-a may be incapable of sending transmissions using a DSRC wireless communications technology. UE 115-b may be a DSRC device, capable of communicating with UE 115-a (and other devices) using DSRC wireless communications technology. In some examples, time on a channel allocated for sending V2X safety messages may be divided into repeating intervals, such as LTE-V2X interval 210 and DSRC interval 215. During an interval, a UE 115 may be permitted to send transmissions using its own wireless communication technology without first checking whether the channel is being used by other types of devices. Base station 105-a may, for example, reserve resources for sending LTE-V2X transmissions during LTE-V2X interval 210 and may similarly reserve resources for sending DSRC transmissions during DSRC interval 215.

However, in some examples, a channel dedicated to communications by one specific type of V2X technology may not be an efficient use of resources, especially if one technology is more prevalent than another technology. For instance, during LTE-V2X interval 210, UE 115-a may have no LTE-V2X safety messages to send, leaving the channel available. If UE 115-b has DSRC safety messages to send, the channel may be more efficiently used if UE 115-b is permitted to send DSRC transmissions during conflicting LTE-V2X interval 210. Conditions under which such transmissions may be sent during conflicting intervals are described in greater detail with respect to FIGS. 3-5.

Figure 3:
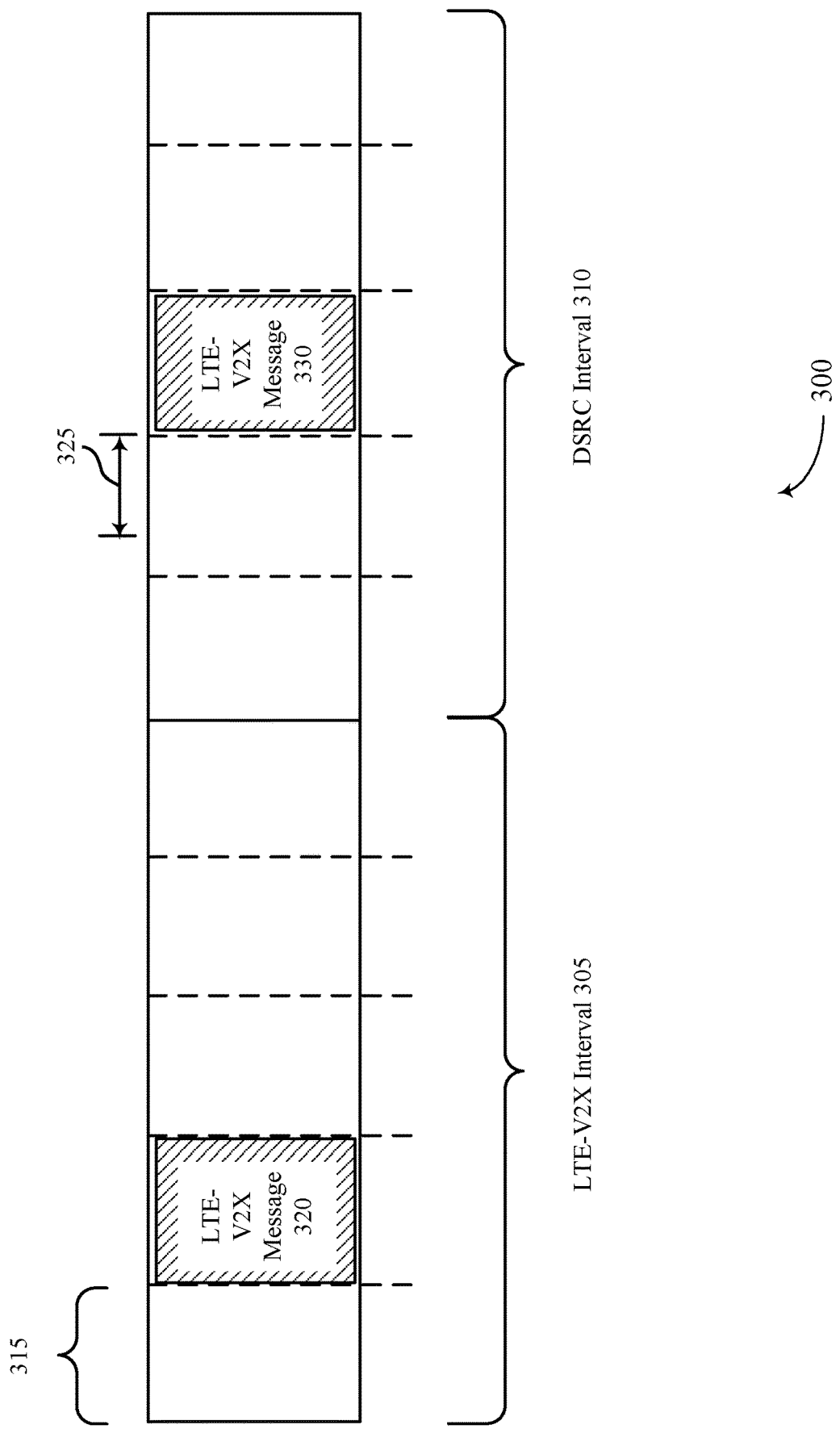
FIG. 3 illustrates an example of a timeline that supports multiple wireless communication technology co-channel coexistence in accordance with aspects of the present disclosure.

FIG. 3 illustrates an example of a timeline 300 that supports multiple wireless communication technology co-channel coexistence in accordance with aspects of the present disclosure. In some examples, timeline 300 may implement aspects of wireless communication system 100. Co-channel coexistence may be achieved with minimal changes to either wireless communication technology. For instance, LTE resource may be reserved for an LTE-V2X interval 305, and resources may be reserved for DSRC transmissions during DSRC interval 310. In some examples, software may be updated or changed to allow DSRC UEs to support co-channel coexistence.

An LTE-V2X UE (e.g., UE 115-a illustrated and described with respect to FIG. 2) may identify LTE-V2X interval 305 and DSRC interval 310 (which may alternate repeatedly with respect to time). Each of LTE-V2X interval 305 and DSRC interval 310 may include a set (e.g., one or more) of subframes 315. Each subframe may have a duration of, for example, 1 ms. UE 115-a may have an LTE-V2X message 320 to send. During a subframe of LTE-V2X interval 305, UE 115-a may transmit LTE-V2X message 320, without first checking the channel to ensure that DSRC UEs 115 (e.g., UE 115-b illustrated and described with respect to FIG. 2) are not utilizing the channel.

During DSRC interval 310, UE 115-a may determine whether the channel is available for LTE-V2X transmissions before sending an LTE-V2X transmission. UE 115-a may perform energy detection 325 for a threshold amount of time before a subframe boundary (e.g., a few symbols). Because DSRC transmissions are not required by DSRC protocol to have a duration of 1 ms, nor are DSRC transmissions required to align with subframe boundaries, UE 115-a may perform energy detection 325 before a subframe boundary. UE 115-a may detect total energy during energy detection 325, and may also detect LTE-V2X energy. UE 115-a may calculate a ratio of LTE-V2X energy to total energy. If the ratio is high (e.g., satisfies a preconfigured threshold), then UE 115-a may determine that the number of LTE-V2X UEs 115-a transmitting on the channel during DSRC interval 310 is relatively high, indicating that DSRC UEs 115-b are not utilizing the entire available channel. In one illustrative example, if one other LTE-V2X UE 115-a is using the channel during the DSRC interval 310 because no other DSRC UEs 115-b are currently using the channel, then the ratio of DSRC energy to total energy will be high. In such examples, UE 115-a may determine to send LTE-V2X message 330 at the subframe boundary after energy detection 325. Alternatively, if the ratio is low (below a preconfigured threshold), then UE 115-a may determine that the number of LTE-V2X UEs 115-a transmitting on the channel during DSRC interval 310 is relatively low, indicating that DSRC UEs 115-b are using a portion of the channel (e.g., all or most of the channel). In such examples, UE 115-b may determine not to send LTE-V2X message 330, and may perform energy detection 325 prior to a subsequent subframe boundary during DSRC interval 310. In some examples, UE 115-a may wait until a subsequent LTE-V2X interval 305, and may send LTE-V2X message 330 during the subsequent LTE-V2X interval 305.

Figure 4:
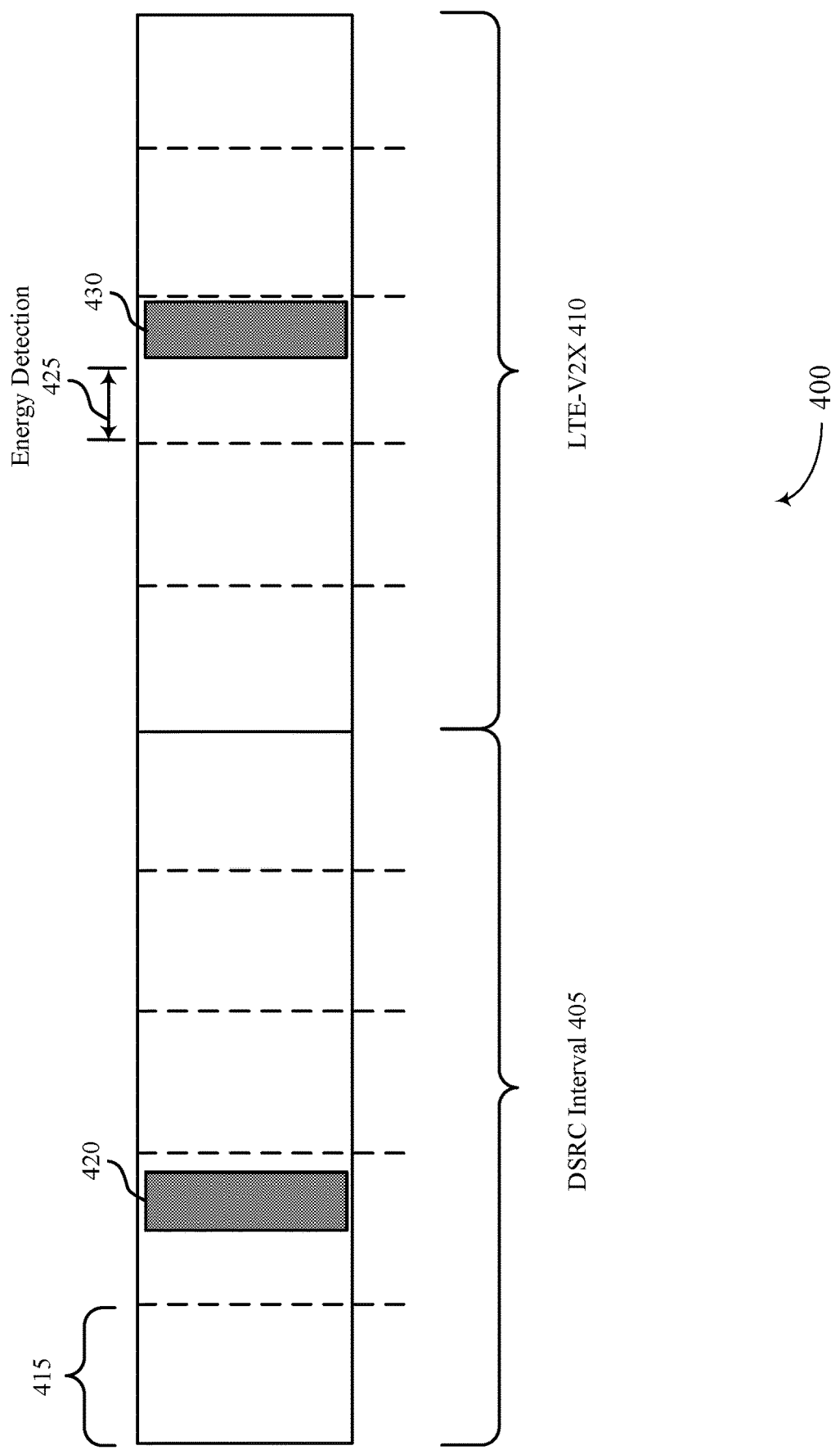
FIG. 4 illustrates an example of a timeline that supports multiple wireless communication technology co-channel coexistence in accordance with aspects of the present disclosure.

DSRC UEs 115-*b* may also benefit from co-channel coexistence, as described in greater detail with respect to FIG. 4.

FIG. 4 illustrates an example of a timeline 400 that supports multiple wireless communication technology co-channel coexistence in accordance with aspects of the present disclosure. In some examples, timeline 400 may implement aspects of wireless communication system 100.

A DSRC UE 115 (e.g., UE 115-*b* illustrated and described with respect to FIG. 2) may identify DSRC interval 405 and LTE-V2X interval 410 (which may alternate repeatedly with respect to time). Each of LTE-V2X interval 410 and DSRC interval 3405 may include a set (e.g., one or more) of subframes 415. Each subframe may have a duration of, for example, 1 ms. UE 115-*b* may have a DSRC V2X message 420 to send. DSRC V2X message 420 may have a duration of less than 1 ms (e.g., a few symbols). During a subframe of DSRC interval 405, UE 115-*b* may transmit DSRC V2X message 420, without first checking the channel to ensure that LTE-V2X UEs 115 (e.g., UE 115-*a* illustrated and described with respect to FIG. 2) are not utilizing the channel.

During LTE-V2X interval 410, UE 115-*b* may determine whether the channel is available for DSRC transmissions before sending a DSRC transmission. As described above, LTE-V2X transmissions may be initiated and terminated at subframe boundaries. As a result, a DSRC UE 115-*b* may be able to determine if a subframe is available for sending DSRC transmissions by performing energy detection 425 for a threshold amount of time (e.g., a few symbols) after a subframe boundary. If the DSRC UE 115-*b* determines that the channel is not totally (or mostly) used by LTE-V2X UEs 115-*a*, then UE 115-*b* may confidently send DSRC V2X message 430 during the same subframe (because no new LTE-V2X transmissions will initiate until after the next subframe boundary).

DSRC UE 115-*b* may detect DSRC energy and total energy during energy detection 425. UE 115-*b* may calculate a ratio of DSRC energy to total energy. If the ratio satisfies a preconfigured threshold (e.g., exceeds the preconfigured threshold), then the UE 115-*b* may determine that there are no (e.g., or very few) LTE-V2X UEs 115-*a* using the channel during LTE-V2X interval 410. In such examples, UE 115-*b* may send DSRC V2X message 430 after performing energy detection 425. Alternatively, if the ratio is low (e.g., below the preconfigured threshold), then UE 115-*b* may determine that the channel is being utilized by one or more LTE-V2X UEs 115-*a*. In such examples, UE 115-*b* may refrain from sending DSRC V2X message 430 during that subframe. Instead, UE 115-*b* may perform another energy detection 425 during a subsequent subframe (e.g., after a subsequent subframe boundary) or may wait until a subsequent (e.g., next) DSRC interval 405 to send DSRC V2X message 430 without performing energy detection.

Figure 5:
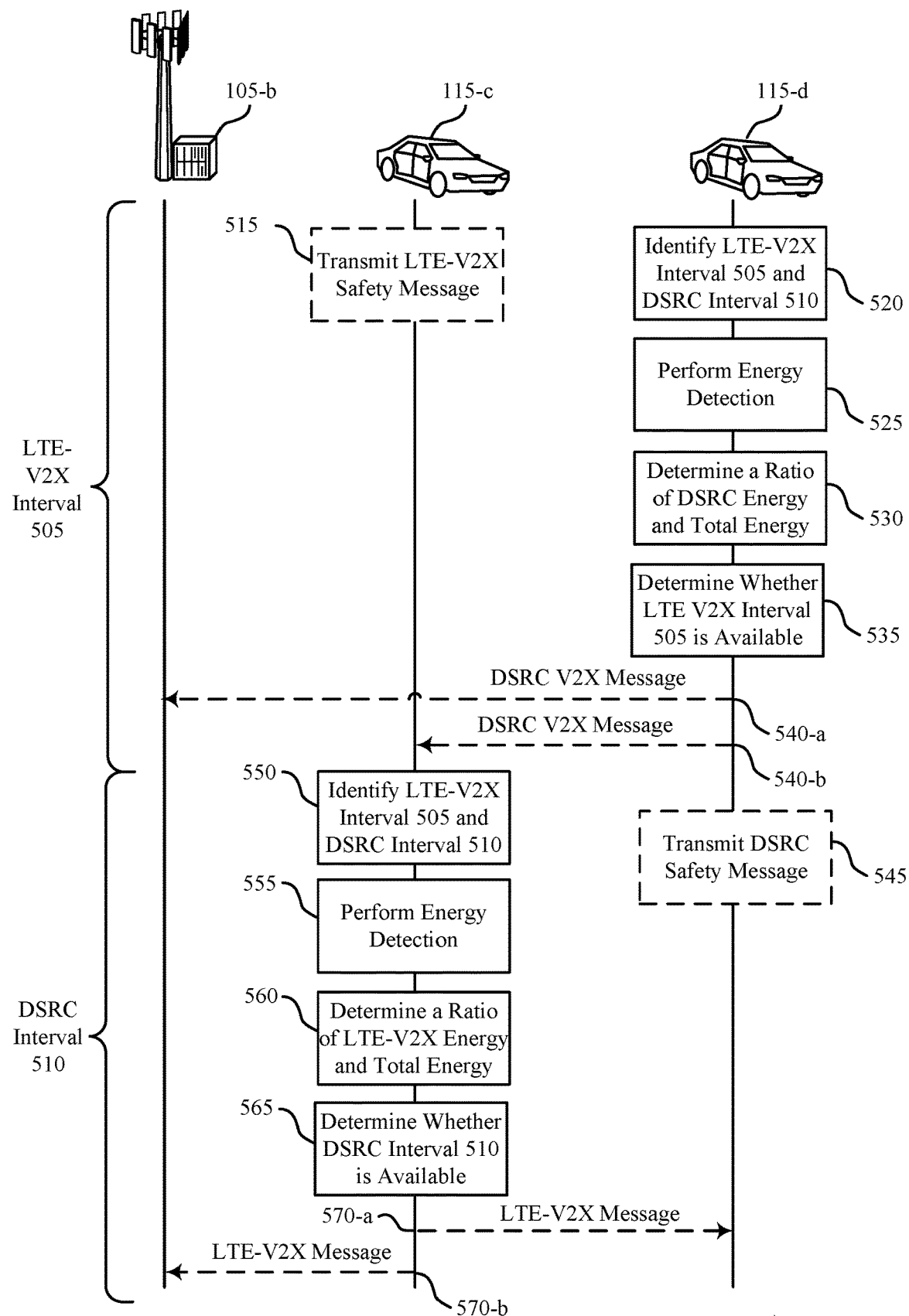
FIG. 5 illustrates an example of a process flow that supports multiple wireless communication technology co-channel coexistence in accordance with aspects of the present disclosure.

FIG. 5 illustrates an example of a process flow 500 that supports multiple wireless communication technology co-channel coexistence in accordance with aspects of the present disclosure. In some examples, process flow 500 may implement aspects of wireless communication system 100.

UE 115-*d* may identify LTE-V2X interval 505 and DSRC interval 510. At 515 (during LTE-V2X interval 505) UE 115-*c* may transmit an LTE-V2X message without performing energy detection.

At 520, UE 115-*d* may identify LTE-V2X interval 505 and DSRC interval 510. LTE-V2X interval 505 and DSRC interval 510 may be designated for transmission of V2X messages in a channel.

At 525, UE 115-*d* may perform energy detection for a threshold amount of time (e.g., one or more symbols) after a subframe boundary. At 530, UE 115-*d* may determine a ratio of DSRC energy and total energy.

At 535, UE 115-*d* may determine whether LTE-V2X interval 505 is available. For example, if the ratio of DSRC energy to total energy satisfies (e.g., exceeds) a threshold value, then UE 115-*d* may determine that no (or few) UEs 115-*c* are currently transmitting on the channel during LTE-V2X interval 505. In such examples, UE 115-*d* may determine that the channel is available, and may send DSRC V2X message 540-*a* to a base station 105-*b* (or other device) or DSRC V2X message 540-*b* to another UE 115 (e.g., UE 115-*c*).

At 545, during DSRC interval 510, UE 115-*d* may transmit a DSRC V2X message without performing energy detection.

At 550, UE 115-*c* may identify LTE-V2X interval 505 and DSRC interval 510. At 555, UE 115-*c* may perform energy detection for a threshold amount of time (e.g., one or more symbols) prior to a subframe boundary.

At 560, UE 115-*c* may determine a ratio of LTE-V2X energy to total energy, and at 565 UE 565 may determine whether DSRC interval 510 is available. IF the ratio of DSRC energy to total energy is high, then UE 115-*c* may determine that UE 115-*d* did not transmit DSRC V2X message at 545 (or that the transmission of 545 is complete). In such cases, UE 115-*c* may send LTE-V2X message to another UE 115 (e.g., UE 115-*d*) at 570-*a*, or to a base station 105-*b* (or another device) at 570-*b*. If the ratio of DSRC energy to total energy is low, then UE 115-*c* may determine that one or more UEs 115-*d* are utilizing the channel for DSRC transmissions during DSRC interval 510, and may refrain from transmitting LTE-V2X message at 570. Instead, UE 115-*c* may wait until a subsequent LTE-V2X interval 505 and send the LTE-V2X safety message then.

Figure 6:
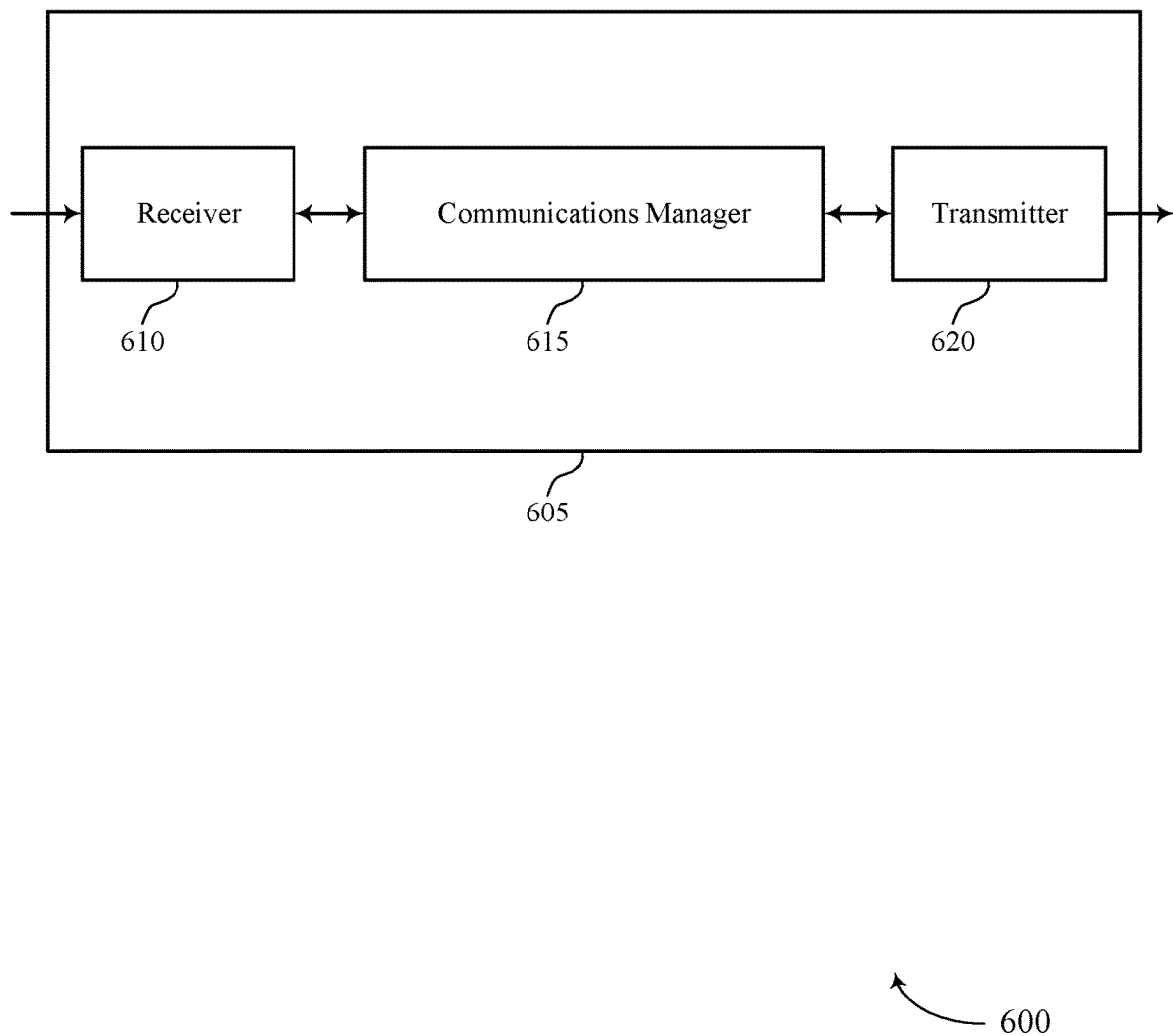
FIGS. 6 and 7 show block diagrams of devices that support multiple wireless communication technology co-channel coexistence in accordance with aspects of the present disclosure.

FIG. 6 shows a block diagram 600 of a device 605 that supports multiple wireless communication technology co-channel coexistence in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to multiple wireless communication technology co-channel coexistence, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify a first set of time intervals designated for transmission of vehicle-to-everything (V2X) messages in a channel using a first wireless communication technology, identify a second set of time intervals designated for transmission of V2X messages in the channel using a second wireless communication technology, the first set of time intervals being separate from the second set of time intervals, determine whether one of the second set of time intervals is available for transmission of one or more V2X messages of the first wireless communication technology, and transmit the one or more V2X messages of the first wireless communication technology during at least one of the first set of time intervals or during the one of the second set of time intervals based on the availability of the one of the second set of time intervals. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver. For example, the transmitter 620 may be an example of aspects of the transceiver 920 described with reference to FIG. 9. The transmitter 620 may utilize a single antenna or a set of antennas.

In some examples, the communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The communications manager 615 as described herein may be implemented to realize one or more potential advantages. One implementation may allow co-channel coexistence between two wireless communication technologies to increase efficient use of available spectrum, and efficient utilization of computational resources. Additionally, a long-term coexistence scheme as described herein, as opposed to a TTI level coexistence scheme, may further increase efficiency and improve user experience.

Figure 9:
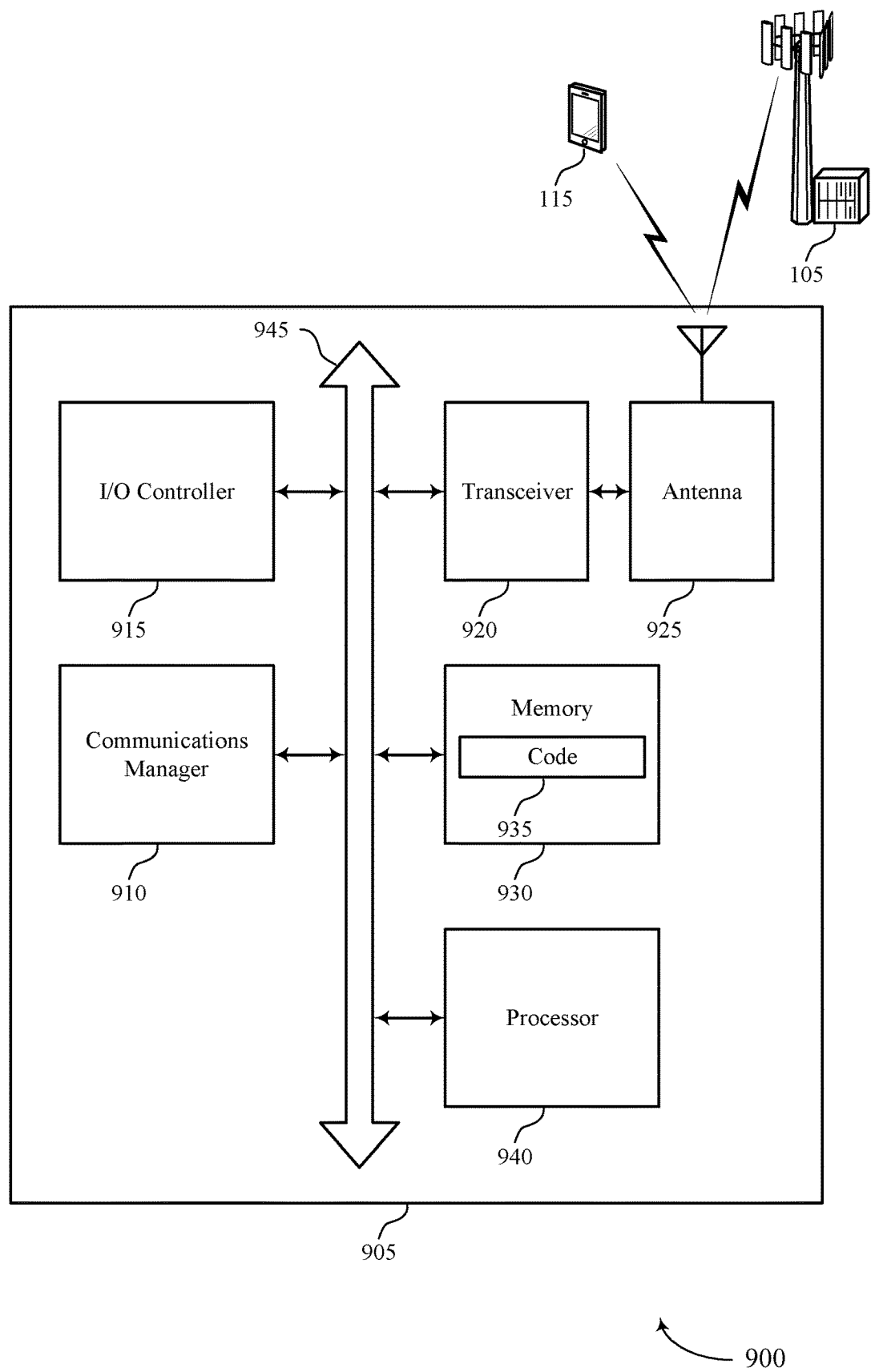
FIG. 9 shows a diagram of a system including a device that supports multiple wireless communication technology co-channel coexistence in accordance with aspects of the present disclosure.

Based on techniques for efficiently communicating maximum number of layers for a device as described herein, a processor of a UE 115 (e.g., controlling the receiver 610, the transmitter 620, or a transceiver 920 as described with respect to FIG. 9) may increase system efficiency and decrease unnecessary processing at a device.

Figure 7:
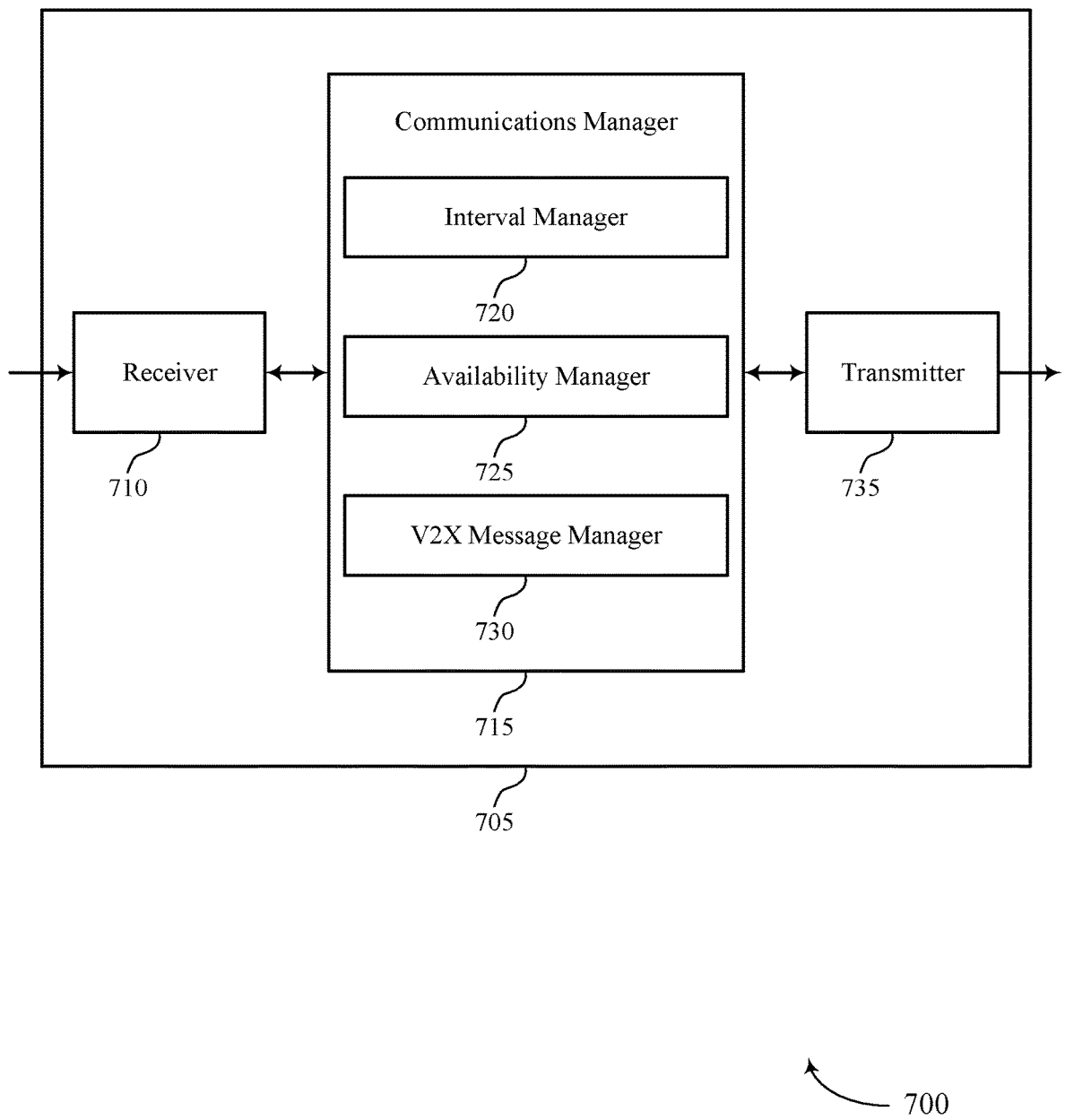

FIG. 7 shows a block diagram 700 of a device 705 that supports multiple wireless communication technology co-channel coexistence in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to multiple wireless communication technology co-channel coexistence, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an interval manager 720, an availability manager 725, and a V2X message manager 730. The communications manager 715 may be an example of aspects of the communications manager 910 described herein.

The interval manager 720 may identify a first set of time intervals designated for transmission of vehicle-to-everything (V2X) messages in a channel using a first wireless communication technology and identify a second set of time intervals designated for transmission of V2X messages in the channel using a second wireless communication technology, the first set of time intervals being separate from the second set of time intervals.

The availability manager 725 may determine whether one of the second set of time intervals is available for transmission of one or more V2X messages of the first wireless communication technology.

The V2X message manager 730 may transmit the one or more V2X messages of the first wireless communication technology during at least one of the first set of time intervals or during the one of the second set of time intervals based on the availability of the one of the second set of time intervals.

The transmitter 735 may transmit signals generated by other components of the device 705. In some examples, the transmitter 735 may be collocated with a receiver 710 in a transceiver. For example, the transmitter 735 may be an example of aspects of the transceiver 920 described with reference to FIG. 9. The transmitter 735 may utilize a single antenna or a set of antennas.

Figure 8:
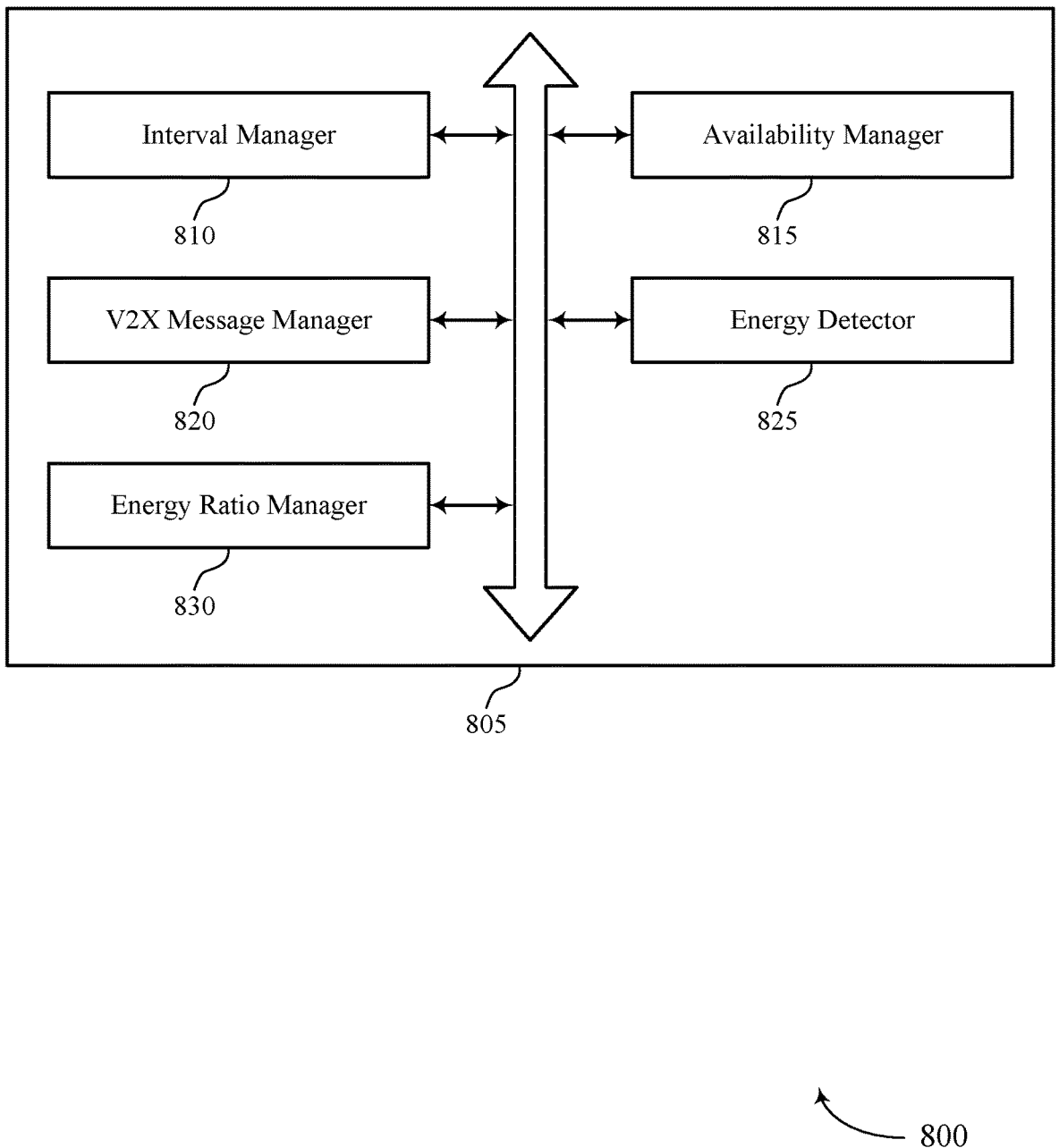
FIG. 8 shows a block diagram of a communications manager that supports multiple wireless communication technology co-channel coexistence in accordance with aspects of the present disclosure.

FIG. 8 shows a block diagram 800 of a communications manager 805 that supports multiple wireless communication technology co-channel coexistence in accordance with aspects of the present disclosure. The communications manager 805 may be an example of aspects of a communications manager 615, a communications manager 715, or a communications manager 910 described herein. The communications manager 805 may include an interval manager 810, an availability manager 815, a V2X message manager 820, an energy detector 825, and an energy ratio manager 830. Each of these managers may communicate, directly or indirectly, with one another (e.g., via one or more buses).

The interval manager 810 may identify a first set of time intervals designated for transmission of vehicle-to-everything (V2X) messages in a channel using a first wireless communication technology.

In some examples, the interval manager 810 may identify a second set of time intervals designated for transmission of V2X messages in the channel using a second wireless communication technology, the first set of time intervals being separate from the second set of time intervals. In some cases, the first wireless communication technology is long-term evolution (LTE) V2X and the second wireless communication technology is dedicated short-range communications (DSRC).

In some cases, the first wireless communication technology is dedicated short-range communications (DSRC) and the second wireless communication technology is long-term evolution (LTE) V2X. The availability manager 815 may determine whether one of the second set of time intervals is available for transmission of one or more V2X messages of the first wireless communication technology.

In some examples, the availability manager 815 may transmit the one or more V2X message of the first wireless communication technology during the one of the second set of time intervals based on determining that the one of the second set of time intervals is available for transmission of the one or more V2X message of the first wireless communication technology.

In some examples, the availability manager 815 may transmit the one or more V2X messages of the first wireless communication technology during at least one of the first set of time intervals based on determining that the one of the second set of time intervals is not available for transmission of one or more V2X message of the first wireless communication technology.

The V2X message manager 820 may transmit the one or more V2X messages of the first wireless communication technology during at least one of the first set of time intervals or during the one of the second set of time intervals based on the availability of the one of the second set of time intervals. In some cases, the one or more V2X messages include at least one V2X safety message.

The energy detector 825 may perform energy detection on the channel. In some examples, the energy detector 825 may detect energy of the first wireless communication technology on the channel and detecting total energy on the channel. In some examples, the energy detector 825 may perform the energy detection within a threshold amount of time prior to a subframe boundary during the one of the second set of time intervals. In some examples, the energy detector 825 may perform the energy detection within a threshold amount of time after a subframe boundary during the one of the second set of time intervals.

The energy ratio manager 830 may determine a ratio of the energy of the first wireless communication technology and the total energy. In some examples, the energy ratio manager 830 may determine whether the ratio satisfies a preconfigured threshold, where the one of the second set of time intervals is available for transmission of one or more V2X messages of the first wireless communication technology if the ratio satisfies the preconfigured threshold.

FIG. 9 shows a diagram of a system 900 including a device 905 that supports multiple wireless communication technology co-channel coexistence in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify a first set of time intervals designated for transmission of vehicle-to-everything (V2X) messages in a channel using a first wireless communication technology, identify a second set of time intervals designated for transmission of V2X messages in the channel using a second wireless communication technology, the first set of time intervals being separate from the second set of time intervals, determine whether one of the second set of time intervals is available for transmission of one or more V2X messages of the first wireless communication technology, and transmit the one or more V2X messages of the first wireless communication technology during at least one of the first set of time intervals or during the one of the second set of time intervals based on the availability of the one of the second set of time intervals.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting multiple wireless communication technology co-channel coexistence).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
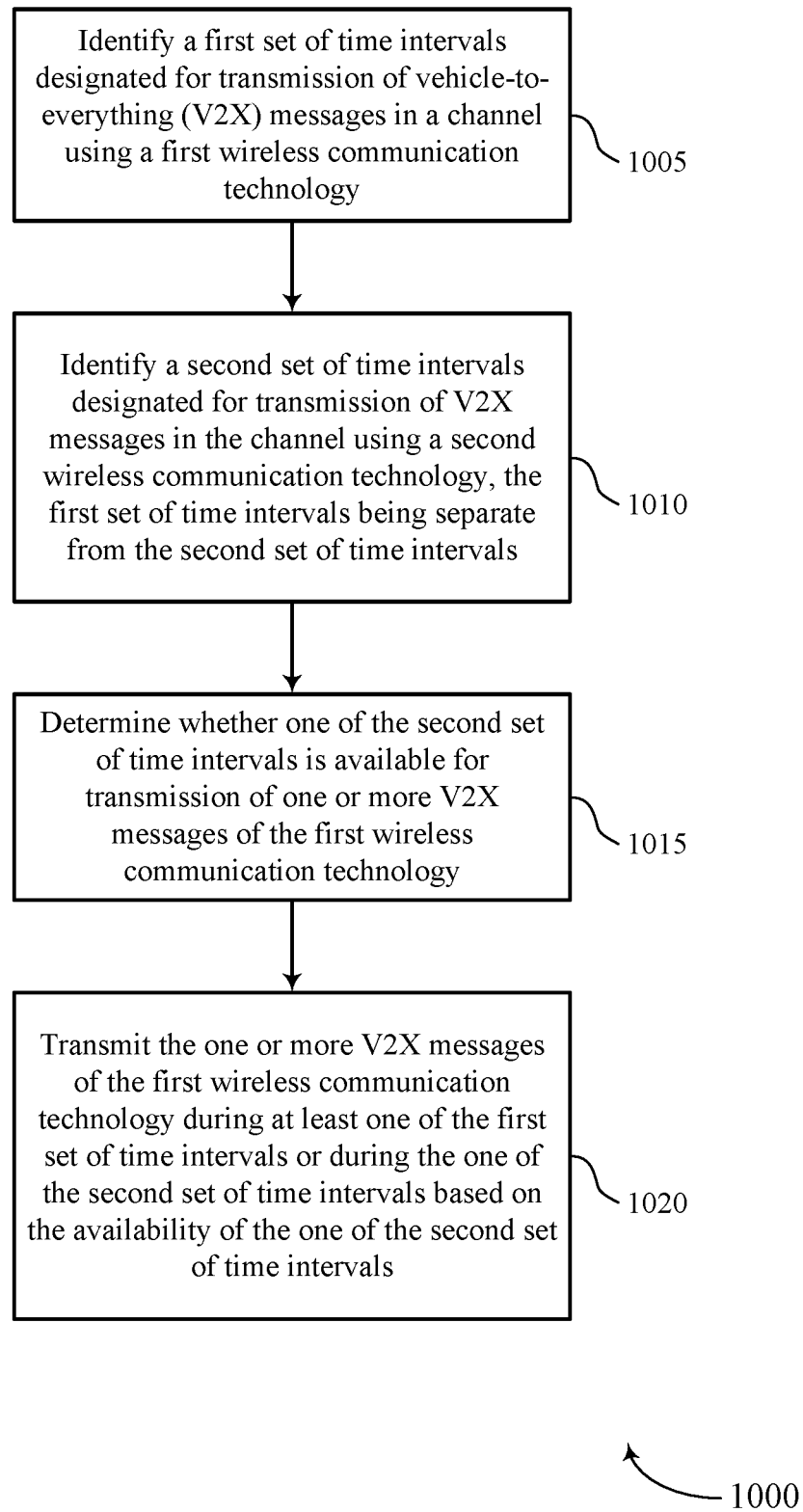
FIGS. 10 and 11 show flowcharts illustrating methods that support multiple wireless communication technology co-channel coexistence in accordance with aspects of the present disclosure.

FIG. 10 shows a flowchart illustrating a method 1000 that supports multiple wireless communication technology co-channel coexistence in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1005, the UE may identify a first set of time intervals designated for transmission of vehicle-to-everything (V2X) messages in a channel using a first wireless communication technology. The operations of 1005 may be performed according to the methods described herein. In some examples, aspects of the operations of 1005 may be performed by an interval manager as described with reference to FIGS. 6 through 9.

At 1010, the UE may identify a second set of time intervals designated for transmission of V2X messages in the channel using a second wireless communication technology, the first set of time intervals being separate from the second set of time intervals. The operations of 1010 may be performed according to the methods described herein. In some examples, aspects of the operations of 1010 may be performed by an interval manager as described with reference to FIGS. 6 through 9.

At 1015, the UE may determine whether one of the second set of time intervals is available for transmission of one or more V2X messages of the first wireless communication technology. The operations of 1015 may be performed according to the methods described herein. In some examples, aspects of the operations of 1015 may be performed by an availability manager as described with reference to FIGS. 6 through 9.

At 1020, the UE may transmit the one or more V2X messages of the first wireless communication technology during at least one of the first set of time intervals or during the one of the second set of time intervals based on the availability of the one of the second set of time intervals. The operations of 1020 may be performed according to the methods described herein. In some examples, aspects of the operations of 1020 may be performed by a V2X message manager as described with reference to FIGS. 6 through 9.

Figure 11:
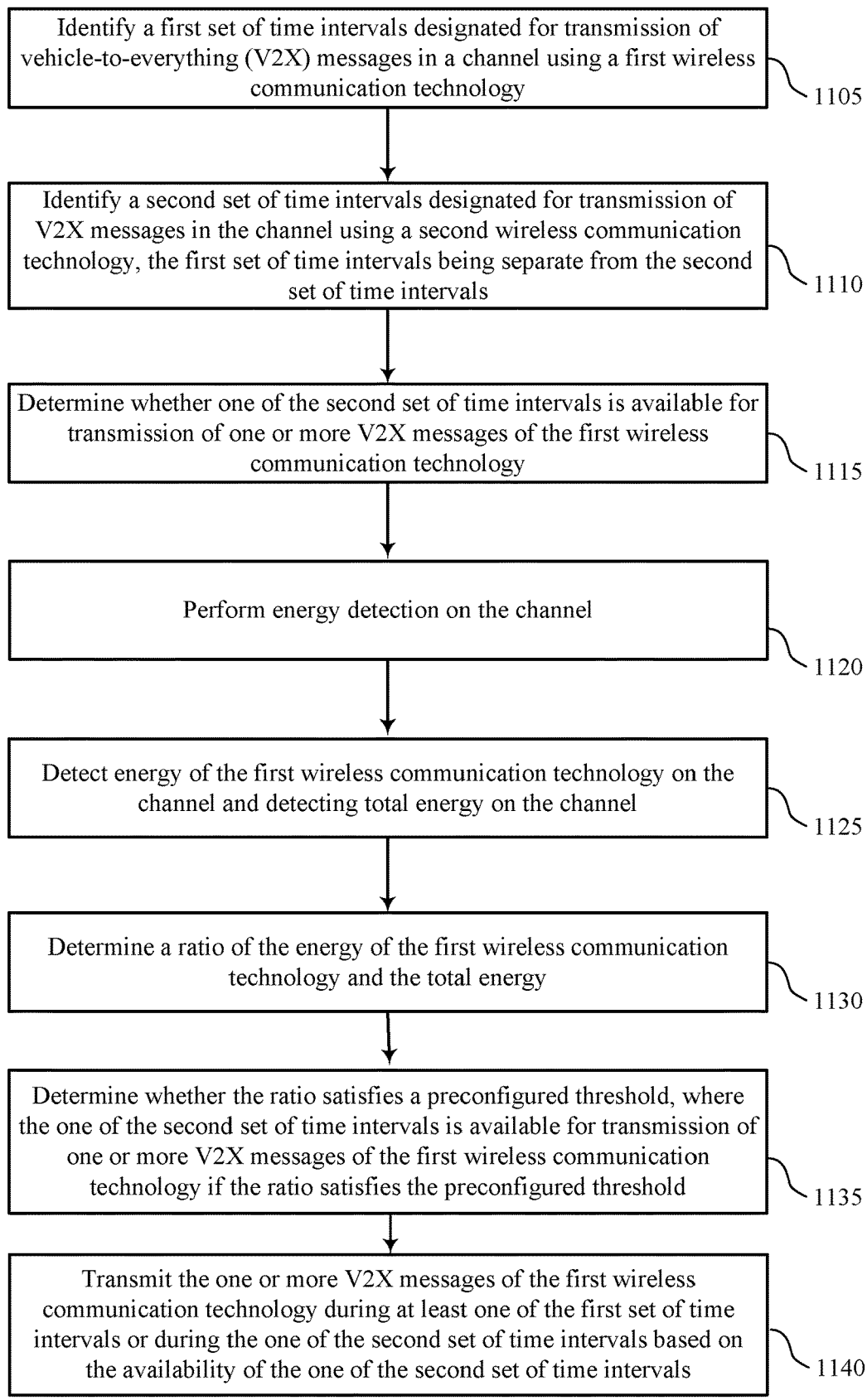

FIG. 11 shows a flowchart illustrating a method 1100 that supports multiple wireless communication technology co-channel coexistence in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1105, the UE may identify a first set of time intervals designated for transmission of vehicle-to-everything (V2X) messages in a channel using a first wireless communication technology. The operations of 1105 may be performed according to the methods described herein. In some examples, aspects of the operations of 1105 may be performed by an interval manager as described with reference to FIGS. 6 through 9.

At 1110, the UE may identify a second set of time intervals designated for transmission of V2X messages in the channel using a second wireless communication technology, the first set of time intervals being separate from the second set of time intervals. The operations of 1110 may be performed according to the methods described herein. In some examples, aspects of the operations of 1110 may be performed by an interval manager as described with reference to FIGS. 6 through 9.

At 1115, the UE may determine whether one of the second set of time intervals is available for transmission of one or more V2X messages of the first wireless communication technology. The operations of 1115 may be performed according to the methods described herein. In some examples, aspects of the operations of 1115 may be performed by an availability manager as described with reference to FIGS. 6 through 9.

At 1120, the UE may perform energy detection on the channel. The operations of 1120 may be performed according to the methods described herein. In some examples, aspects of the operations of 1120 may be performed by an energy detector as described with reference to FIGS. 6 through 9.

At 1125, the UE may detect energy of the first wireless communication technology on the channel and detecting total energy on the channel. The operations of 1125 may be performed according to the methods described herein. In some examples, aspects of the operations of 1125 may be performed by an energy detector as described with reference to FIGS. 6 through 9.

At 1130, the UE may determine a ratio of the energy of the first wireless communication technology and the total energy. The operations of 1130 may be performed according to the methods described herein. In some examples, aspects of the operations of 1130 may be performed by an energy ratio manager as described with reference to FIGS. 6 through 9.

At 1135, the UE may determine whether the ratio satisfies a preconfigured threshold, where the one of the second set of time intervals is available for transmission of one or more V2X messages of the first wireless communication technology if the ratio satisfies the preconfigured threshold. The operations of 1135 may be performed according to the methods described herein. In some examples, aspects of the operations of 1135 may be performed by an energy ratio manager as described with reference to FIGS. 6 through 9.

At 1140, the UE may transmit the one or more V2X messages of the first wireless communication technology during at least one of the first set of time intervals or during the one of the second set of time intervals based on the availability of the one of the second set of time intervals. The operations of 1140 may be performed according to the methods described herein. In some examples, aspects of the operations of 1140 may be performed by a V2X message manager as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous examples or aspects described herein.

EXAMPLE 1

A method of wireless communications comprising identifying a first set of time intervals designated for transmission of V2X messages in a channel using a first wireless communication technology, identifying a second set of time intervals designated for transmission of V2X messages in the channel using a second wireless communication technology, the first set of time intervals being separate from the second set of time intervals, determining whether one of the second set of time intervals is available for transmission of one or more V2X messages of the first wireless communication technology, and transmitting the one or more V2X messages of the first wireless communication technology during at least one of the first set of time intervals or during the one of the second set of time intervals based on the availability of the one of the second set of time intervals.

EXAMPLE 2

The method of example 1, wherein determining whether one of the second set of time intervals may be available for transmission of one or more V2X messages of the first wireless communication technology may include operations, features, means, or instructions for performing energy detection on the channel.

EXAMPLE 3

The method of example 2, wherein performing energy detection further may include detecting energy of the first wireless communication technology on the channel and detecting total energy on the channel.

EXAMPLE 4

The method of example 3, wherein determining whether one of the second set of time intervals may be available for transmission of one or more V2X messages of the first wireless communication technology further may include determining a ratio of the energy of the first wireless communication technology and the total energy, and determining whether the ratio satisfies a preconfigured threshold, where the one of the second set of time intervals may be available for transmission of one or more V2X messages of the first wireless communication technology if the ratio satisfies the preconfigured threshold.

EXAMPLE 5

The method of any of examples 2 to 4, wherein performing energy detection on the channel further may include performing the energy detection within a threshold amount of time prior to a subframe boundary during the one of the second set of time intervals.

EXAMPLE 6

The method of any of examples 2 to 4, wherein performing energy detection on the channel further may include performing the energy detection within a threshold amount of time after a subframe boundary during the one of the second set of time intervals.

EXAMPLE 7

The method of any of examples 1 to 6, further comprising: transmitting the one or more V2X message of the first wireless communication technology during the one of the second set of time intervals based on determining that the one of the second set of time intervals may be available for transmission of the one or more V2X message of the first wireless communication technology.

EXAMPLE 8

The method of any of examples 1 to 7, further comprising: transmitting the one or more V2X messages of the first wireless communication technology during at least one of the first set of time intervals based on determining that the one of the second set of time intervals may be not available for transmission of one or more V2X message of the first wireless communication technology.

EXAMPLE 9

The method of any of examples 1 to 8, wherein the first wireless communication technology may be LTE V2X and the second wireless communication technology may be DSRC.

EXAMPLE 10

The method of any of examples 1 to 9, wherein the first wireless communication technology may be DSRC and the second wireless communication technology may be LTE V2X.

EXAMPLE 11

The method of any of examples 1 to 10, wherein the one or more V2X messages include at least one V2X safety message.

EXAMPLE 12

An apparatus comprising at least one means for performing a method of any of examples 1 to 11.

EXAMPLE 13

An apparatus for wireless communications comprising a processor; memory in electronic communication with the processor; and instructions stored in the memory and executable by the processor to cause the apparatus to perform a method of any of examples 1 to 11.

EXAMPLE 14

A non-transitory computer-readable medium storing code for wireless communications, the code comprising instructions executable by a processor to perform a method of any of examples 1 to 11.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1, 1X, etc. IS-856 (TIA-856) is commonly referred to as CDMA2000 1xEV- DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and managers described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   identifying a first set of time intervals designated for transmission of vehicle-to-everything (V2X) messages in a channel using a first wireless communication technology;
   identifying a second set of time intervals designated for transmission of V2X messages in the channel using a second wireless communication technology, the first set of time intervals being separate from the second set of time intervals;
   determining whether one of the second set of time intervals is available for transmission of one or more V2X messages of the first wireless communication technology; and
   transmitting the one or more V2X messages of the first wireless communication technology during at least one of the first set of time intervals or during the one of the second set of time intervals based at least in part on the availability of the one of the second set of time intervals.

2. The method of claim 1, wherein determining whether one of the second set of time intervals is available for transmission of one or more V2X messages of the first wireless communication technology comprises:
   performing energy detection on the channel.

3. The method of claim 2, wherein performing energy detection further comprises:
   detecting energy of the first wireless communication technology on the channel and detecting total energy on the channel.

4. The method of claim 3, wherein determining whether one of the second set of time intervals is available for transmission of one or more V2X messages of the first wireless communication technology further comprises:
   determining a ratio of the energy of the first wireless communication technology and the total energy; and
   determining whether the ratio satisfies a preconfigured threshold, wherein the one of the second set of time intervals is available for transmission of one or more V2X messages of the first wireless communication technology if the ratio satisfies the preconfigured threshold.

5. The method of claim 2, wherein performing energy detection on the channel further comprises:
   performing the energy detection within a threshold amount of time prior to a subframe boundary during the one of the second set of time intervals.

6. The method of claim 2, wherein performing energy detection on the channel further comprises:
   performing the energy detection within a threshold amount of time after a subframe boundary during the one of the second set of time intervals.

7. The method of claim 1, further comprising:
   transmitting the one or more V2X message of the first wireless communication technology during the one of the second set of time intervals based at least in part on determining that the one of the second set of time intervals is available for transmission of the one or more V2X message of the first wireless communication technology.

8. The method of claim 1, further comprising:
   transmitting the one or more V2X messages of the first wireless communication technology during at least one of the first set of time intervals based at least in part on determining that the one of the second set of time intervals is not available for transmission of one or more V2X message of the first wireless communication technology.

9. The method of claim 1, wherein the first wireless communication technology is long-term evolution (LTE) V2X and the second wireless communication technology is dedicated short-range communications (DSRC).

10. The method of claim 1, wherein the first wireless communication technology is dedicated short-range communications (DSRC) and the second wireless communication technology is long-term evolution (LTE) V2X.

11. The method of claim 1, wherein the one or more V2X messages include at least one V2X safety message.

12. An apparatus for wireless communications, comprising:
   a processor,
   memory in electronic communication with the processor; and
   instructions stored in the memory and executable by the processor to cause the apparatus to:
      identify a first set of time intervals designated for transmission of vehicle-to-everything (V2X) messages in a channel using a first wireless communication technology;
      identify a second set of time intervals designated for transmission of V2X messages in the channel using a second wireless communication technology, the first set of time intervals being separate from the second set of time intervals;
      determine whether one of the second set of time intervals is available for transmission of one or more V2X messages of the first wireless communication technology; and
      transmit the one or more V2X messages of the first wireless communication technology during at least one of the first set of time intervals or during the one of the second set of time intervals based at least in part on the availability of the one of the second set of time intervals.

13. The apparatus of claim 12, wherein the instructions executable by the processor to determine whether one of the second set of time intervals is available for transmission of one or more V2X messages of the first wireless communication technology are further executable by the processor to:
perform energy detection on the channel.

14. The apparatus of claim 13, wherein the instructions executable by the processor to perform energy detection are further executable by the processor to:
detect energy of the first wireless communication technology on the channel and detecting total energy on the channel.

15. The apparatus of claim 14, wherein the instructions executable by the processor to determine whether one of the second set of time intervals is available for transmission of one or more V2X messages of the first wireless communication technology are further executable by the processor to:
determine a ratio of the energy of the first wireless communication technology and the total energy; and
determine whether the ratio satisfies a preconfigured threshold, wherein the one of the second set of time intervals is available for transmission of one or more V2X messages of the first wireless communication technology if the ratio satisfies the preconfigured threshold.

16. The apparatus of claim 13, wherein the instructions executable by the processor to perform energy detection on the channel are further executable by the processor to:
perform the energy detection within a threshold amount of time prior to a subframe boundary during the one of the second set of time intervals.

17. The apparatus of claim 13, wherein the instructions executable by the processor to perform energy detection on the channel are further executable by the processor to:
perform the energy detection within a threshold amount of time after a subframe boundary during the one of the second set of time intervals.

18. The apparatus of claim 12, further comprising instructions executable by the processor to:
transmit the one or more V2X message of the first wireless communication technology during the one of the second set of time intervals based at least in part on determining that the one of the second set of time intervals is available for transmission of the one or more V2X message of the first wireless communication technology.

19. The apparatus of claim 12, further comprising instructions executable by the processor to:
transmit the one or more V2X messages of the first wireless communication technology during at least one of the first set of time intervals based at least in part on determining that the one of the second set of time intervals is not available for transmission of one or more V2X message of the first wireless communication technology.

20. The apparatus of claim 12, wherein the first wireless communication technology is long-term evolution (LTE) V2X and the second wireless communication technology is dedicated short-range communications (DSRC).

21. The apparatus of claim 12, wherein the first wireless communication technology is dedicated short-range communications (DSRC) and the second wireless communication technology is long-term evolution (LTE) V2X.

22. The apparatus of claim 12, wherein the one or more V2X messages include at least one V2X safety message.

23. An apparatus for wireless communications, comprising:
means for identifying a first set of time intervals designated for transmission of vehicle-to-everything (V2X) messages in a channel using a first wireless communication technology;
means for identifying a second set of time intervals designated for transmission of V2X messages in the channel using a second wireless communication technology, the first set of time intervals being separate from the second set of time intervals;
means for determining whether one of the second set of time intervals is available for transmission of one or more V2X messages of the first wireless communication technology; and
means for transmitting the one or more V2X messages of the first wireless communication technology during at least one of the first set of time intervals or during the one of the second set of time intervals based at least in part on the availability of the one of the second set of time intervals.

24. The apparatus of claim 23, wherein the means for determining whether one of the second set of time intervals is available for transmission of one or more V2X messages of the first wireless communication technology comprises:
means for performing energy detection on the channel.

25. The apparatus of claim 24, wherein the means for performing energy detection further comprises:
means for detecting energy of the first wireless communication technology on the channel and detecting total energy on the channel.

26. The apparatus of claim 25, wherein the means for determining whether one of the second set of time intervals is available for transmission of one or more V2X messages of the first wireless communication technology further comprises:
means for determining a ratio of the energy of the first wireless communication technology and the total energy; and
means for determining whether the ratio satisfies a preconfigured threshold, wherein the one of the second set of time intervals is available for transmission of one or more V2X messages of the first wireless communication technology if the ratio satisfies the preconfigured threshold.

27. The apparatus of claim 23, further comprising:
means for transmitting the one or more V2X message of the first wireless communication technology during the one of the second set of time intervals based at least in part on determining that the one of the second set of time intervals is available for transmission of the one or more V2X message of the first wireless communication technology.

28. The apparatus of claim 23, further comprising:
means for transmitting the one or more V2X messages of the first wireless communication technology during at least one of the first set of time intervals based at least in part on determining that the one of the second set of time intervals is not available for transmission of one or more V2X message of the first wireless communication technology.

29. The apparatus of claim 23, wherein the one or more V2X messages include at least one V2X safety message.

30. A non-transitory computer-readable medium storing code for wireless communications, the code comprising instructions executable by a processor to:

identify a first set of time intervals designated for transmission of vehicle-to-everything (V2X) messages in a channel using a first wireless communication technology;

identify a second set of time intervals designated for transmission of V2X messages in the channel using a second wireless communication technology, the first set of time intervals being separate from the second set of time intervals;

determine whether one of the second set of time intervals is available for transmission of one or more V2X messages of the first wireless communication technology; and transmit the one or more V2X messages of the first wireless communication technology during at least one of the first set of time intervals or during the one of the second set of time intervals based at least in part on the availability of the one of the second set of time intervals.

* * * * *